US 6,641,633 B2
Nov. 4, 2003

(12) United States Patent
Witengier (54) GAS/LIQUID SEPARATOR FOR A PNEUMATIC LINE

(76) Inventor: Julian L. Witengier, 4 Topwood, Manchester, MO (US) 63011

( * ) Notice: Subject to any disclaimer, the term of this patent is extended or adjusted under 35 U.S.C. 154(b) by 0 days.

(21) Appl. No.: 10/120,725

(22) Filed: Apr. 11, 2002

(65) Prior Publication Data

US 2003/0177743 A1 Sep. 25, 2003

Related U.S. Application Data (60) Provisional application No. 60/285,313, filed on Apr. 23, 2001.

(51) Int. Cl.⁷ .................. B01D 50/00; B01D 53/26; B01D 45/06; B01D 45/08
(52) U.S. Cl. .................. 55/319; 55/320; 55/324; 55/462; 55/503; 96/134
(58) Field of Search ................. 55/319, 320, 324, 55/462, 503, DIG. 17; 96/134, 139

(56) References Cited

U.S. PATENT DOCUMENTS

| 3,957,469 A | * | 5/1976 | Nebash ............ 73/863.22 |
| 5,482,402 A | | 1/1996 | Nelson |
| 5,657,644 A | | 8/1997 | Oakey et al. |
| 5,660,607 A | | 8/1997 | Jokschas et al. |
| 5,669,154 A | | 9/1997 | Bellomo |
| 5,699,673 A | | 12/1997 | Hoshino et al. |
| 5,800,584 A | | 9/1998 | Hinderer et al. |
| 6,006,603 A | | 12/1999 | Molnar et al. |
| 6,010,320 A | | 1/2000 | Kwon |
| 6,048,376 A | | 4/2000 | Miller |
| 6,077,488 A | | 6/2000 | Jain et al. |
| 6,082,137 A | | 7/2000 | Higginbotham |
| 6,102,665 A | | 8/2000 | Centers et al. |

FOREIGN PATENT DOCUMENTS

EP         0073895 A1  *  3/1983  .................. 96/134

* cited by examiner

*Primary Examiner*—Robert A. Hopkins
(74) *Attorney, Agent, or Firm*—Paul M. Denk (57) ABSTRACT

A separator plate is provided in a dryer housing which is connected to a desiccant can for use in, for example, drying and cleaning the air for pneumatic lines. The separator plate includes a conical or domed section surrounded by a baffle which in combination, define an expansion chamber within the dryer housing. The expansion chamber is lined on its inner surfaces with a coalescing/filtering media which will remove oil aerosols and vapors, and water aerosols and vapors from the air passing through the housing. The separator plate also include a ring of coalescing/filtering media externally of the expansion chamber, but which the air must pass through prior to exiting the separator housing and entering the drying canister.

11 Claims, 6 Drawing Sheets

GAS/LIQUID SEPARATOR FOR A PNEUMATIC LINE

CROSS-REFERENCE TO RELATED APPLICATIONS

This application claims priority to provisional application Ser. No. 60/285,313 filed Apr. 23, 2001, entitled "Gas/Liquid Separator For A Pneumatic Line", and which is incorporated herein by reference.

STATEMENT REGARDING FEDERALLY SPONSORED RESEARCH OR DEVELOPMENT

Not Applicable.

BACKGROUND OF THE INVENTION

The invention relates in general to filtration and gas/liquid separation, and in particular, to an assembly for removing solids, liquids and/or oil from a gas flow.

More specifically, without restriction to the particular use which is shown and described, this invention relates to an improved filter separator plate assembly to subject a gas to filtering, coalescing, and separation to remove solids, emulsified liquids and/or oils therefrom.

In numerous situations, a continuous liquid or gas phase is subject to the accumulation of contaminants in the form of solid particles, liquids and/or gases, which must be subjected to filtration and separation as attempted by numerous techniques of the prior art. The contaminating material may, for example, be present as a solid, liquid, or gas within a gas media, or dispersed as a solid, liquid or gas within a liquid. Foreign matter is prevalent, for example, in pneumatic lines used in conjunction with air brakes for trucks, buses and heavy equipment, as well as for protecting other pneumatically operated devices such as doors, cylinders, etc.

Many devices in the prior art have relied upon the phenomenon of coalescing dispersed liquid from a fluid as a means to overcome the problems inherent in the accumulation of liquid in a fuel line. Such coalescing devices rely on a coalescing material to coalesce the liquids into droplets which are more readily separated from the fuel than in the dispersed state. The prior art coalescing devices have been deficient in providing an economical and trouble free device that is capable of highly efficient removal of dispersed liquids in all demand ranges of the vehicle engine. Some of the prior art devices may operate satisfactorily at low flow rates through the separator, but as the engine output increases, the flow rate becomes greater and efficiency of coalescing and separation then suffers in such devices resulting in water particles, and the like, being delivered to the air compressor. The overall deficiency of such coalescing systems has resulted, in part, from the ineffective cooperation between the incoming flow and the coalescing stage.

Moreover, known coalescing-type apparatus have failed to provide or have not provided sufficient filtration of solids prior to entry to the coalescing stage, because of which the coalescing operation becomes less efficient due to the interfering presence of solids. The prior art coalescing devices have not further provided effective filtration and separation at all flow rates through the separator, with a resulting decrease of efficiency. Accordingly, the known techniques of filtering and separating contaminants from a fluid, such as a diesel oil and the like, have not attained the optimum level of efficiency to accomplish removal of solids, dispersed liquids and gases from a fuel at all demand levels of the engine.

BRIEF SUMMARY OF THE INVENTION

A separator plate is provided in a dryer housing which is connected to a desiccant can for use in, for example, drying and cleaning the air for pneumatic lines. The separator plate includes a conical or domed section surrounded by a baffle which in combination, define an expansion chamber within the dryer housing. The expansion chamber is lined on its inner surfaces with a coalescing/filtering media which will remove oil aerosols and vapors, and water aerosols and vapors from the air passing through the housing. The separator plate also includes a ring of coalescing/filtering media externally of the expansion chamber, but through which the air must pass prior to exiting the separator housing and entering the drying canister.

It has been found that by forcing the air through the tortuous path defined by the expansion chamber, 99.99% of oil aerosols and vapors, and 99.9% of water aerosols are removed from the incoming air prior to the air's further usage.

BRIEF DESCRIPTION OF THE SEVERAL VIEWS OF THE DRAWINGS

Corresponding reference numerals will be used throughout the several figures of the drawings.

DETAILED DESCRIPTION OF THE INVENTION

The following detailed description illustrates the invention by way of example and not by way of limitation. This description will clearly enable one skilled in the art to make and use the invention, and describes several adaptations, variations, alternatives and uses of the invention, including what I presently believe is the best mode of carrying out the invention.

Figure 1:
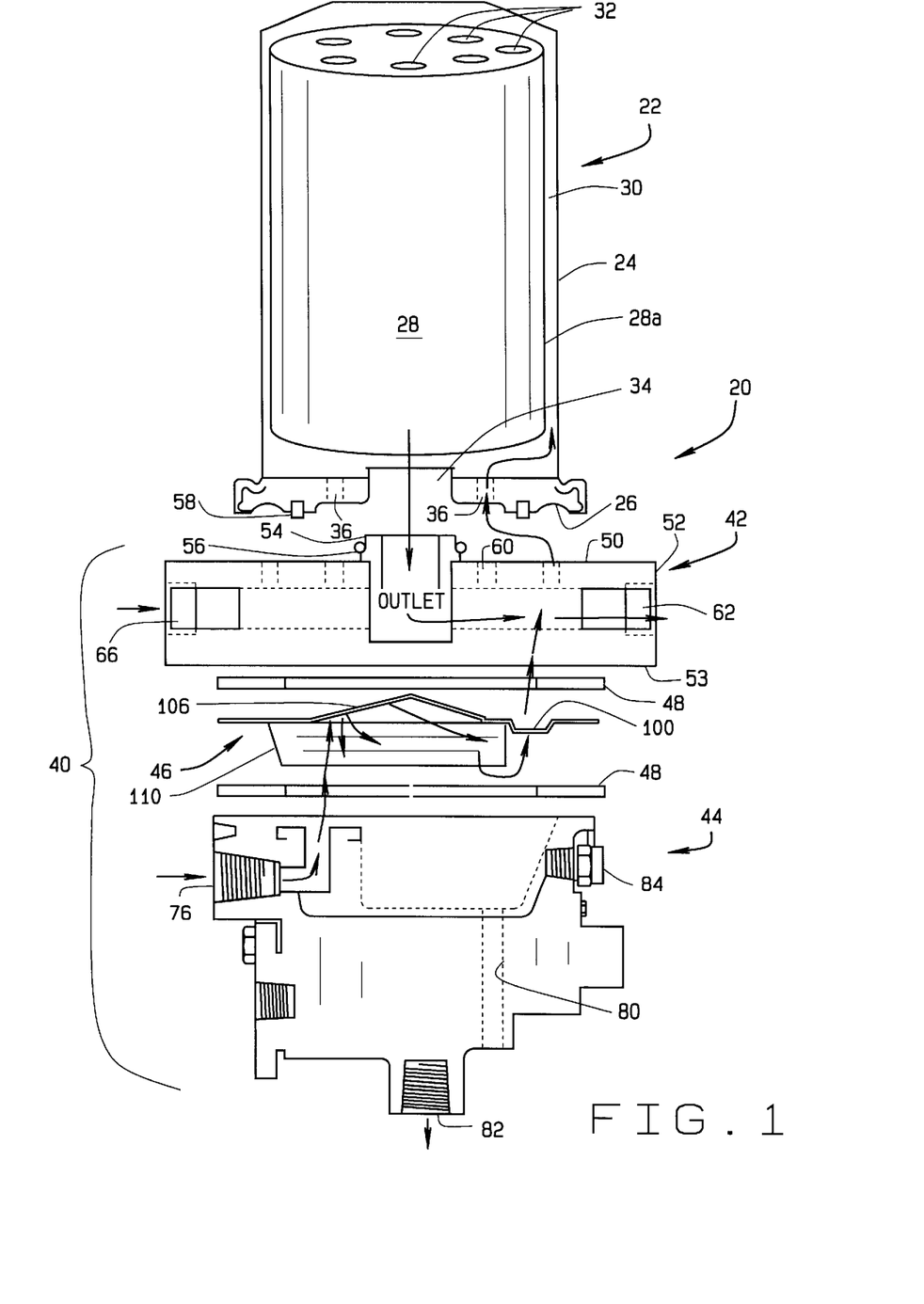
FIG. 1 is a an exploded view of a separator/dryer assembly of the present invention, provided with arrows showing the air path through the assembly.

A dryer 20 of the present invention is shown generally in FIG. 1. The dryer 20 includes a canister 22 which is filled with a desiccant. The canister 22 can be a conventional desiccant canister, such as a canister available from Chicago Rawhide of Elgin, Illinois. The canister 22 includes an outer shell 24 and a bottom 26 which define a chamber which receives a bag 28 of desiccant inside of a containment cylinder 28A. The desiccant bag 28 is smaller in diameter than the shell 24 and the containment cylinder 28A. The shell 24 and cylinder 28A in combination define an annular passage 30 between the containment cylinder 28A and the canister shell 24. As is known, the top plate of the containment cylinder 28A is perforated, as at 32 to allow air to enter the desiccant bag 28, pass through the desiccant therein, and exit out the bottom of the bag. The canister 22 includes a central opening 34 in the canister bottom 26 through which dried air exits the canister. A series of openings 36 surround the exit opening 36 to allow air to enter the canister 22.

The canister 22 is removably mounted to a separator assembly 40. The separator assembly 40 includes a top cap 42, a bottom cap 44, and a separator plate 46 sandwiched between the top and bottom caps. A pair of gaskets 48 are positioned on opposite sides of the separator plate 46 to form air tight seals between the plate 46 and the top and bottom caps 42 and 44. The top and bottom caps 42 and 44 can, for example, be caps such as sold by Chicago Rawhide under the name Brakemaster® Turbo-2000. Of course, other cap assemblies can be used with the invention equally well.

Figure 3:
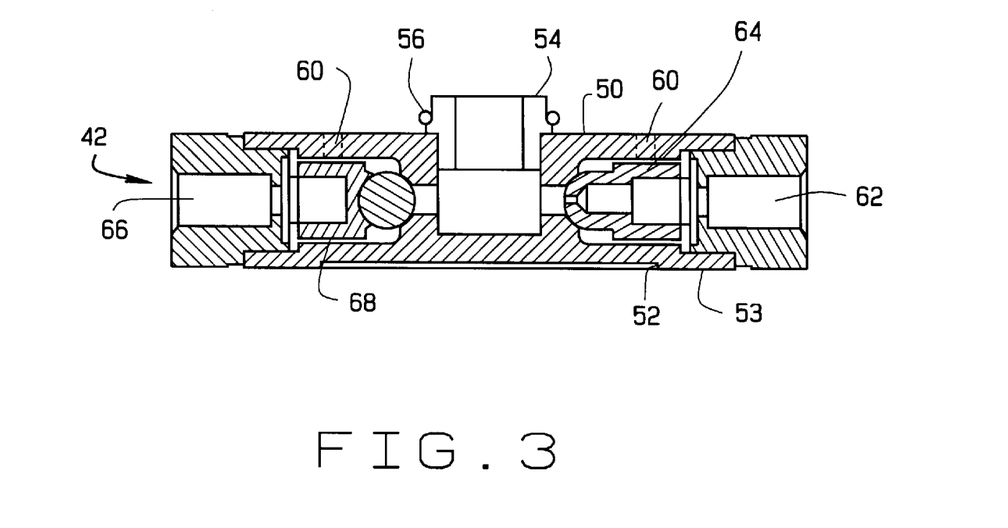
FIG. 3 is a cross-sectional view of a top cap of the dryer assembly.

The dryer top cap 42 is shown in detail in FIG. 3. The top cap includes a top surface 50 and a side wall 52 which define a chamber. A flange 53 extends outwardly from the bottom of the side wall 52. A threaded neck 54 extends upwardly from the top surface 50 and is sized to be threaded into the exit opening 34 of the canister 22. An O-ring 56 is received about the neck 54 and is compressed against the canister bottom 26 to form an air-tight seal between the neck and the canister. Additionally, the canister includes a gasket 58 which surrounds the canister entrance holes 36. The canister gasket 58 compresses against the top cap top surface 50 to form an air tight seal between the canister and the top cap. The top cap includes a series of openings 60 around the neck (but within the perimeter of the canister gasket 58). Thus, air flows from the top cap chamber through the top cap openings 60, the canister openings 36, and into the canister 22 to pass along the annular passage 30 to enter the desiccant bag 28 to be dried.

The top cap neck 54 which is in fluid communication with the canister exit opening 34, communicates with an exit passage 62 in the top cap. A bleed valve 64 can be placed in the exit passage 62. A purge passage 66 can also be provided. A check valve 68 is placed in the purge passage 66 to prevent exit air from exiting the separator assembly 40 via the purge passage 66.

Figure 2:
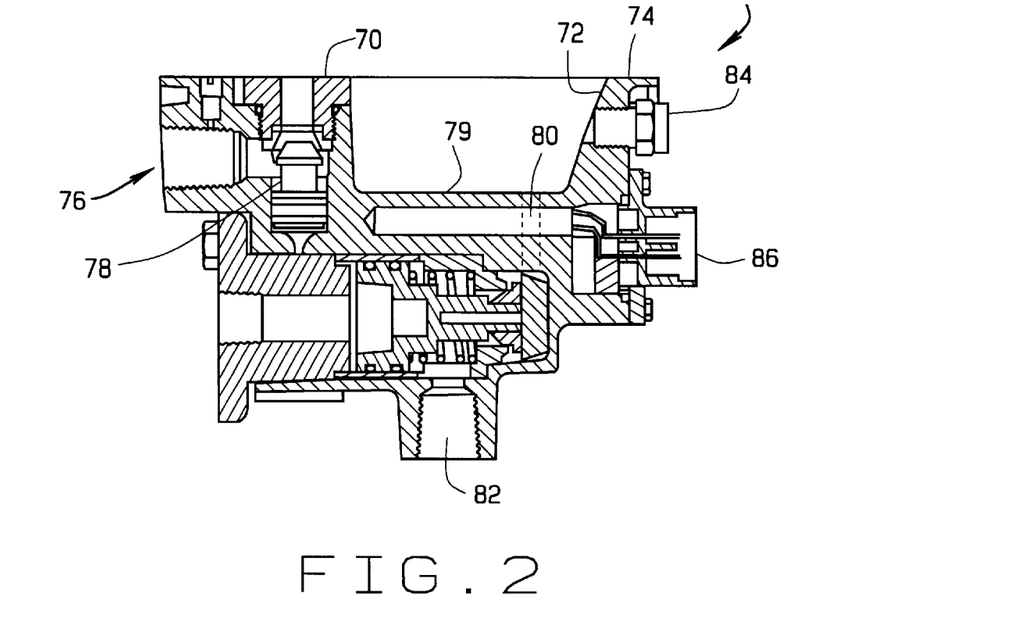
FIG. 2 is cross-sectional view of a bottom cap of the dryer assembly.

The dryer bottom cap 44 is shown in detail in FIG. 2. The bottom cap 44 includes bottom 70 and side wall 72 defining a chamber. A flange 74 extends outwardly from the top of the bottom cap side wall 72. The bottom cap flange 74 includes a plurality of openings therethrough, and the top cap flange includes a plurality of threaded bores. The bottom cap flange openings are alignable with the top cap threaded bores, and bolts are passed therethrough to secure the top and bottom caps together. When assembled, the respective chambers of the top and bottom caps combine to form a single separator chamber.

The bottom cap 44 includes an inlet passage 76 which is in fluid communication with the separator chamber. A turbo valve 78 can be placed in the inlet passage 76. A passage 80 is formed in the floor 79 of the bottom cap and is in fluid communication with a drain opening 82 at the bottom of the bottom cap 44. The bottom cap can also be provided with an over-pressure valve 84 and a heater 86.

The top and bottom caps 42 and 44 can be conventional. The separator plate 46 is positioned between the top and bottom caps, as noted above. The separator plate is covered by a coalescing/filtering media; and the air entering the separator chamber impinges on the coalescing/filtering media. The coalescing/filtering media removes 99.99% of all oil aerosols and oil vapors, as well as 99.9% of water aerosols from the air entering the dryer 20, prior to the air entering the desiccant canister 22. The oils and water which coalesce in the separator chamber pass through the drain passage 80 to exit the separator at the drain 82.

The separator plate 46 is shown in detail in FIGS. 4–10. The plate 46 includes a top surface 88 and a bottom surface 89, includes an outer flange portion 90 having a series of bolt holes 92 therein. The outer circumference of the flange portion 90 corresponds to the circumference of the flanges between the top and bottom caps 42 and 44. The bolt holes 92 are aligned with the holes and bores of the top and bottom caps, and the bolts pass through the plate bolt holes 92 to maintain the plate in position in the separator chamber. gaskets 48 are received on opposite sides of the plate flange 90 to form air tight seals between the plate 48 and the top and bottom caps 42 and 44, as noted above.

A ring section 96 is formed radially inwardly of the flange 90. An arcuate depression 100 is formed in the top surface 88 (to form steps in the bottom surface 89) of the ring section 96. A series of spaced apart elongate openings 102 is formed in the depression 100. The depression 100 does not form a complete circle. Rather, it forms an arc of about 300°. The depression is filled with the coalescing/filtering media 104. The coalescing/filtering media 104 is held in place in the depression, for example, by a screen which is welded to the plate 46, both on the top surface 88 and the bottom surface 89.

Figure 4:
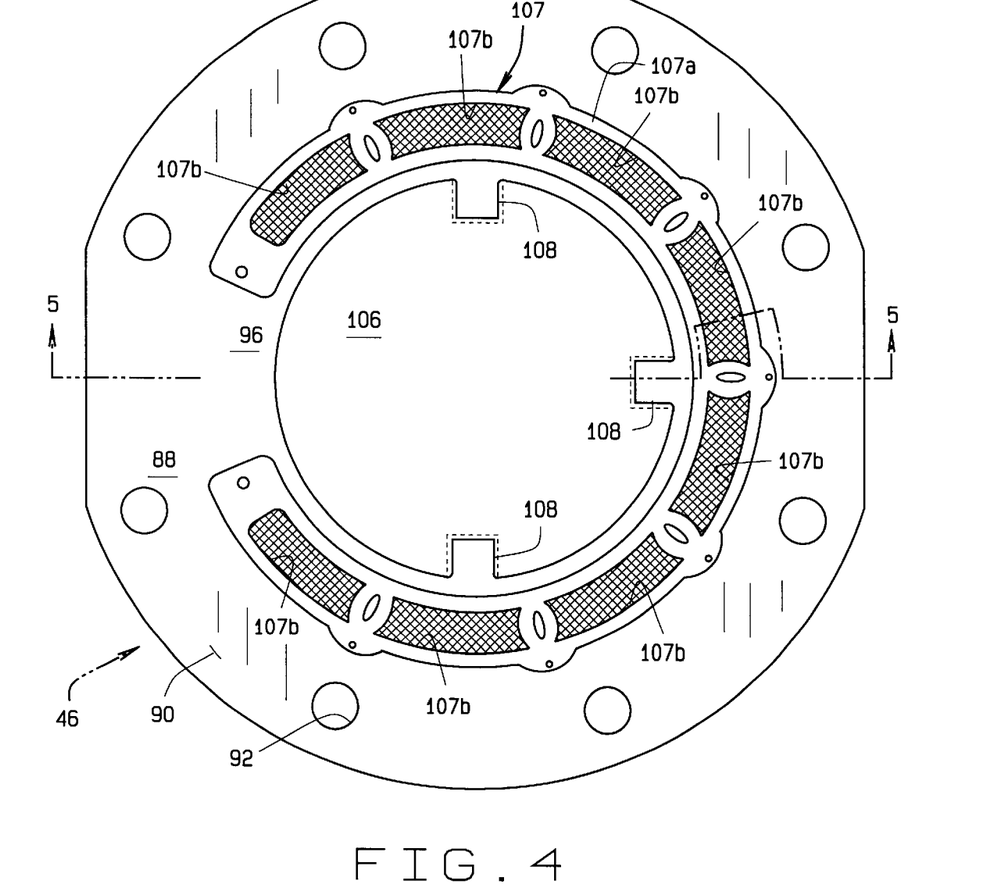
FIG. 4 is a top plan view of the separator, without baffle or deflector.
Figure 5:
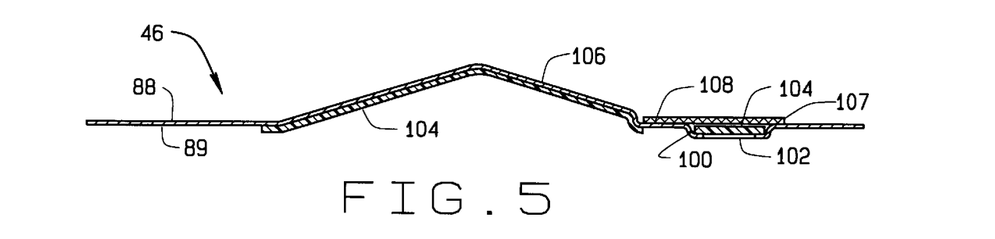
FIG. 5 is a cross-sectional view of the separator (with the baffle and deflector removed) taken along line 5—5 of FIG. 4.

A central conical section 106 extends upwardly from the ring section 96. The conical section 106 as seen, include three flat areas 108. The conical section preferably rises from the plate base at an angle of about 15° to about 20°. The bottom surface of the conical section 106 is also lined with the coalescing/filtering media 104.

The conical section 106 is surrounded, in part, by a baffle 110. The baffle includes tabs 111, three of which are received in the flats 108, and which define connection points to weld, or otherwise fix, the baffle to the plate. The baffle 110 defines an arc around the conical section 106 that is substantially the same size arc as defined by the depression 100. The baffle 110, at its opposite ends 112, extends outwardly, toward the periphery of the plate 46 to define an entrance 114 into the conical section of the plate. The inner surface of the baffle 110 is covered with the coalescing/filtering media 104.

Figure 6:
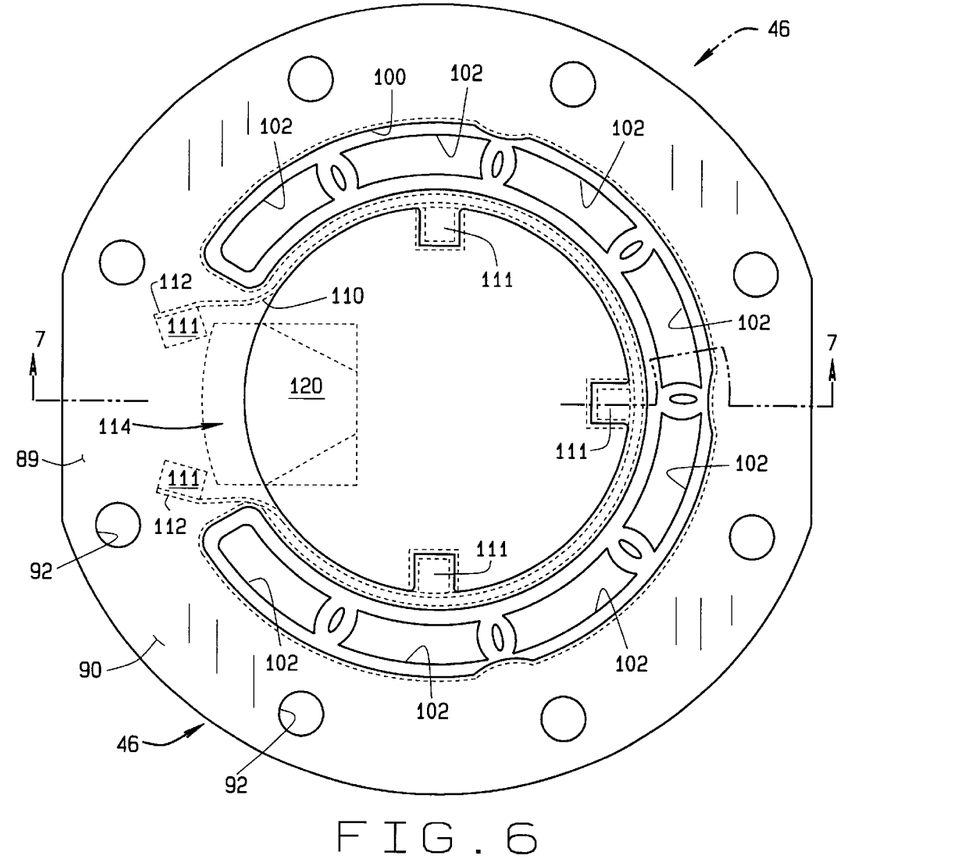
FIG. 6 is a top plan view of the separator, with baffle and deflection installed.
Figure 7:
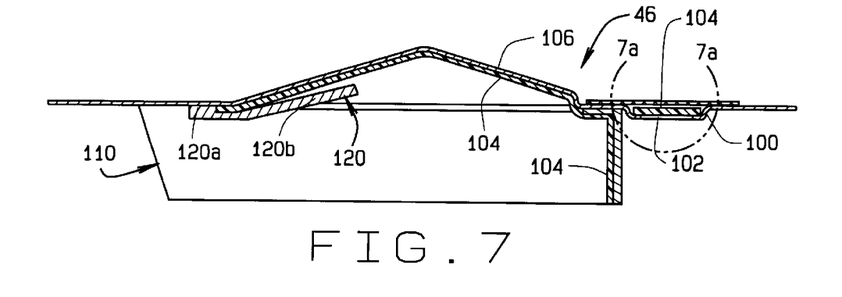
FIG. 7 is a cross-sectional view of the separator taken along line 5—5 of FIG. 6.
Figure 7A:
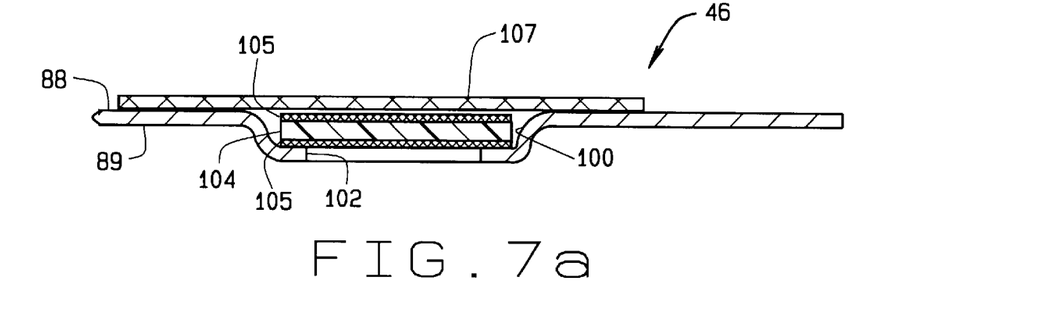
Figure 8:
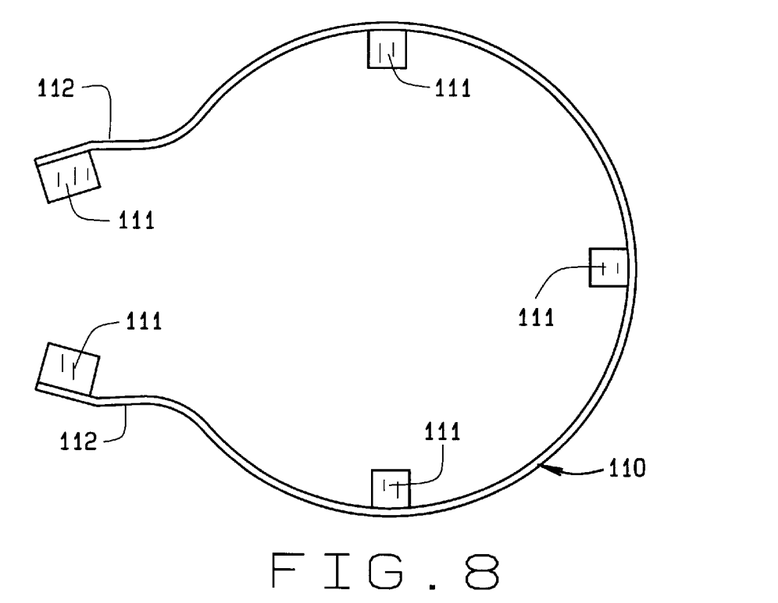
FIG. 8 is a top plan view of the baffle of the separator.
Figure 9:
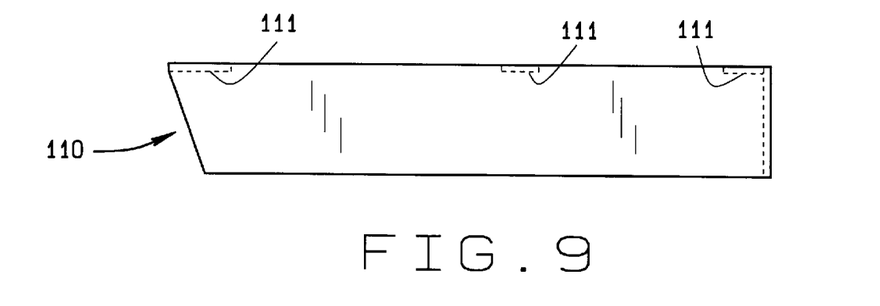
FIG. 9 is a side elevational view of the baffle.

The conical section 106 and the baffle 110 in combination define an expansion chamber within the separator chamber. As can be appreciated, the surfaces of the expansion chamber are all covered with the coalescing/filtering media 104. When the plate 46 is assembled into the separator top and bottom caps, the plate 114 is positioned such that the entrance 114 is generally aligned with the air inlet passage 76, such that air entering the separator chamber will be directed to the expansion chamber through the entrance 114.

Figure 10:
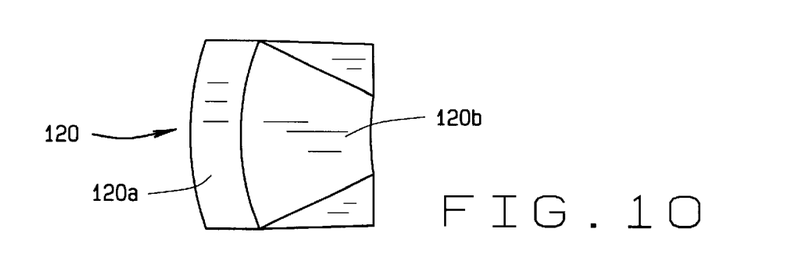
FIG. 10 is a top plan view of a deflector of the separator.

A deflector plate 120 is secured to the plate base at the entrance 114 to the conical section 106 between the ends 112 of the baffle 110. The deflector plate 120 extends from the ring section 96 into the conical section 106. The coalescing material 104 attached to the conical section is between the conical section 106 and the deflector plate 120. As seen best in FIG. 7, the deflector plate 120 bends slightly at the junction between the ring section 96 and the conical section 106, forming a first section 120a and a second section 120b of the deflector plate. The second section 120*b* is spaced from the conical section 106, but above the plane of the ring section 96.

The operation of the dryer 20 will be described with reference to FIG. 1. When the separator plate 46 is placed between the top and bottom caps of the dryer, the conical section 106 of the separator plate creates an expansion chamber for the compressed air which flows into the separator chamber through the inlet passage 76. The compressed air enters the separator chamber and flows into the expansion chamber defined by the conical section 106 through the entrance 114 of the baffle 110. The air strikes the deflector plate 120 which diverts the air flow across the coalescing/filtering media which covers the conical section 106. The air is then diverted downwards, from the conical section surface to the baffle 110. The air thus also impinges against the coalescing/filtering material on the baffle 110. The air then passes under the bottom edge of the baffle to pass through the coalescing/filtering media contained in the trough 100 prior to exiting the top of the separator chamber through the holes 60 in the separator top cap 42. The liquid (oil and water) which is separated from the air drops to the bottom of the separator chamber and exits the chamber through the drain passage 80 and drain port 82.

The separated air (the air which passes through the trough holes 102) passes upward into the canister and flows through the desiccant bag 28, as described above. The air which exits the dryer 20 through the outlet 62 is clean and dry. After the drying agent (i.e., the desiccant) become saturated, the air flow through the dryer 20 can be reversed by passing air through the purging passage 66. This purges the desiccant in the canister 22. When the air flow is reversed, the air will pass into the canister through the separator top cap neck 54 and the canister exit opening 34. The air will thus flow out of the canister through the canister bottom openings 36 and into the separator chamber through the openings 60 in the top cap 42. The reversed air will strike dome of the separator which diverts the air flow radially outwardly, to clean and dry the upper chamber, the separator plate, and the coalescing/filtering media prior to expelling the separated and trapped oil and water aerosols, vapors, and dirt out the valved base of the separator housing.

As can be appreciated, by placing the baffle in the separator chamber, the path the air must follow to exit the separator chamber becomes more tortuous, and the air will repeatedly contact the coalescing/filtering media which lines the expansion chamber defined by the conical section 106 and the baffle 110. Thus, separator efficiency and coalescing efficiency increases each time the flow is diverted, strikes a deflector plate, baffle or housing component, and changes direction.

Figures 11, 12:
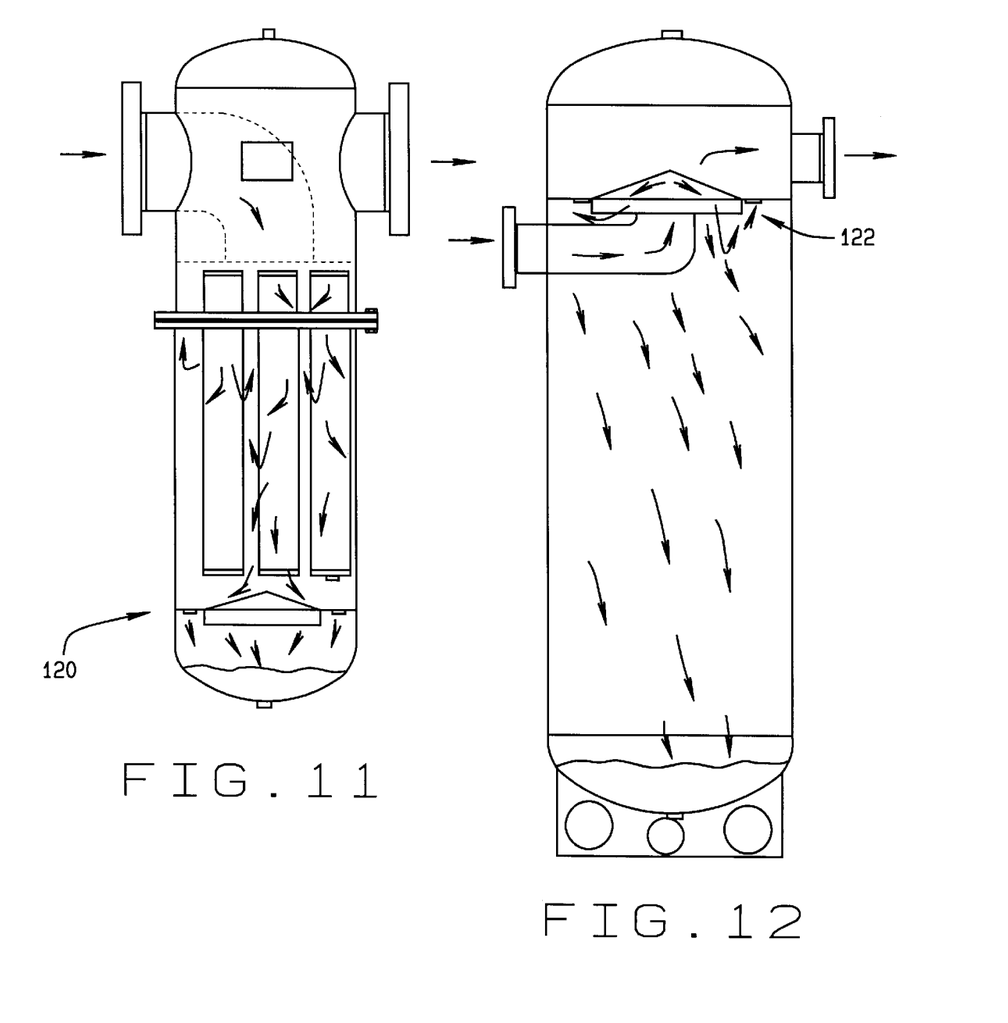
FIG. 11 is a cross-sectional view of the application of this invention within a filter.
FIG. 12 is a cross-sectional view of the application of this invention in an air receiver.

FIG. 11 discloses the application of the separator of this invention as applied within a filter. As installed, as can be seen at 120, the filter functions, with the separator of this invention embodied therein, not only as a separator, but also as an anti-re-intrainment plate, mainly because it is installed in the bottom of the filter, to provide for reduction in the quantity of solids, such as oils, and the like, from the gas or air flow.

FIG. 12 shows an air receiver, where the incoming air impinges upon the bottom of the separator 122 of this invention, again for the separation of solids from the flowing air.

As a summary, of the principal embodied within the operations of the separator of this invention, regardless of its technical installation, when the separator is installed in a vessel, air/gas enters into the expansion chamber created under the dome of the separator. Thus, this reduces the velocity of the air/gas stream coalesces as it strikes the deflector plate, and is further diverted along the dome covered with the coalescing media, changing directions as it strikes the vertical baffle which is also covered with a coalescing media. This changes the direction of the air/gas flow downwardly, approximately 90°, again changing direction 90° upward, through the radial turned ports covered with coalescing/filtering media contained by the upper and lower screens, prior to exiting out of the upper chamber created by the separator and into the dyer desiccant canister. Each change of direction of flow, either along the diverter, along the dome, its baffle, and ports, further enhances the efficiency of the separator, while reducing the amount of liquid aerosols and vapors in the flow stream. Reversing the air/gas stream self-cleans the filtering media in the tuned ports.

Thus, the coalescing is effected by three mechanisms. Initially, through the diffusion principle, particles below 0.3 microns, by way of the Brownian movement, through the random, erratic motion of very small gaseous molecules, around and about the separator of this invention. Secondly, by direct interception, that is, through the application of 0.3–0.5 micron size particles, striking an object, can effect separation. Finally, through inertia impaction, that is through the application of 0.5 micron plus sized particles, that impinge on the obstacle, the fibers of the filtration device, causes separator or coalescence of the solids to effect their separation from the air or gaseous flow. The above three listed factors are the basis of coalescing which is further enhanced in the operations of this separator.

As various changes could be made in the above constructions without departing from the scope of the invention, it is intended that all matter contained in the above description or shown in the accompanying drawings shall be interpreted as illustrative and not in a limiting sense. For example, although the baffle 110 is preferably an arc, the baffle 110 can be formed of two or more segments, which, would, in effect, define multiple entry and exit points to the expansion chamber.

Additional baffles could be placed in the expansion chamber to increase the surface area of the coalescing/filtering media 104, and hence, the efficiency of the coalescing/filtering of the separator. Such other baffles could, for example, depend from the conical surface 106 of the separator plate 46. The expansion chamber need not be conical. It could be domed, square, or any other desired shape. These examples are merely illustrative.

I claim:

1. A separator for removing liquid and particulate matter from an air streams; the separator comprising a housing defining a separator chamber and having an entrance and an exit; said separator chamber having a side wall, a top, and a bottom; and a separator plate positioned within said housing; said separator plate comprising:

a mounting portion securable to the housing to position the separator plate in the housing;

a domed potion having an outer periphery which is spaced from the chamber side wall; said domed portion having a lower surface and an upper surface;

a baffle extending downwardly from said plate, said baffle defining an wall which encompasses the periphery of said domed portion and, in combination with said domed portion, defines an expansion chamber; said baffle having first and second ends positioned to define an entrance into said expansion chamber; said entrance being positioned to be aligned with said separator chamber entrance such air entering said separator chamber enters said expansion chamber;

an opening in said plate on a side of said baffle opposite said domed portion; said plate including a filter media in said opening; said air passing through said filter media prior to exiting said separator chamber.

2. The separator of claim 1 wherein said filter media is applied to the bottom surface of said domed portion and to an inner surface of said baffle.

3. The separator of claim 1 including a deflector plate at said entrance to said expansion chamber.

4. The separator of claim 1 wherein said domed portion is generally conical in shape.

5. A separator plate for separating liquid and particulate matter from a stream of flowing gas; said separator plate comprising;

a top surface and a lower surface;

a domed portion spaced inwardly from the peripheral edge of said plate and extending upwardly from said plate top surface;

a baffle depending from said plate bottom surface around said domed portion; said domed portion and baffle defining an expansion chamber; said baffle having an opening into said expansion chamber; and at least one opening in said plate on a side of said baffle opposite said domed portion; said plate including a filter media in said at least one opening;

whereby, air to be treated first enters said expansion chamber, flows around said baffle, and then passes through said filter media in said at least one opening.

6. The separator plate of claim 5 including a deflector on said plate bottom surface, said deflector being positioned at said entrance to said expansion chamber.

7. The separator plate of claim 6 wherein said deflector comprises a sloped surface which extends upwardly at an angle relative to a plane of said plate.

8. The separator of claim 5 wherein at least one of an inner surface of said baffle and a lower surface of said domed portion are coated with a filter media.

9. The separator of claim 5 wherein said filter media is a filter and coalescing media.

10. The separator of claim 5 wherein said plate includes a depression, said at least one opening being in said depression.

11. The separator of claim 5 including screening secured to said plate to hold said filter media in said at least one opening.

* * * * *